US006265046B1

(12) United States Patent
Swift

(10) Patent No.: US 6,265,046 B1
(45) Date of Patent: Jul. 24, 2001

(54) ELECTRICAL COMPONENT HAVING FIBERS ORIENTED IN AT LEAST TWO DIRECTIONS

(75) Inventor: Joseph A. Swift, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/303,212

(22) Filed: Apr. 30, 1999

(51) Int. Cl.[7] .............................. G03G 15/00; H01B 1/24; B32B 9/00

(52) U.S. Cl. ..................... 428/88; 428/297.4; 428/298.1; 428/299.1; 428/401; 399/37; 399/88; 399/89; 399/90; 399/91

(58) Field of Search .................................... 428/88, 297.4, 428/298.1, 299.1, 401; 399/37, 88, 89, 90, 91

(56) References Cited

U.S. PATENT DOCUMENTS

| | | | |
|---|---|---|---|
| 5,139,862 | 8/1992 | Swift et al. | 428/294 |
| 5,250,756 | 10/1993 | Swift et al. | 174/119 R |
| 5,270,106 | 12/1993 | Orlowski et al. | 428/295 |
| 5,599,615 | 2/1997 | Swift et al. | 428/293.1 |
| 5,794,100 | 8/1998 | Bell et al. | 399/90 |

OTHER PUBLICATIONS

Chung, Carbon Fiber Composites, 95–108, 1994.*

* cited by examiner

*Primary Examiner*—Richard Weisberger
(74) *Attorney, Agent, or Firm*—Zosan S. Soong

(57) ABSTRACT

An electrical component including: a plurality of long fibers and a matrix, wherein at least one of the fibers is electrically conductive, wherein the plurality of long fibers includes a first fiber group extending in a manner generally parallel to a first axis, and a second fiber group extending in a manner generally parallel to a different second axis.

16 Claims, 6 Drawing Sheets

FIG. 6
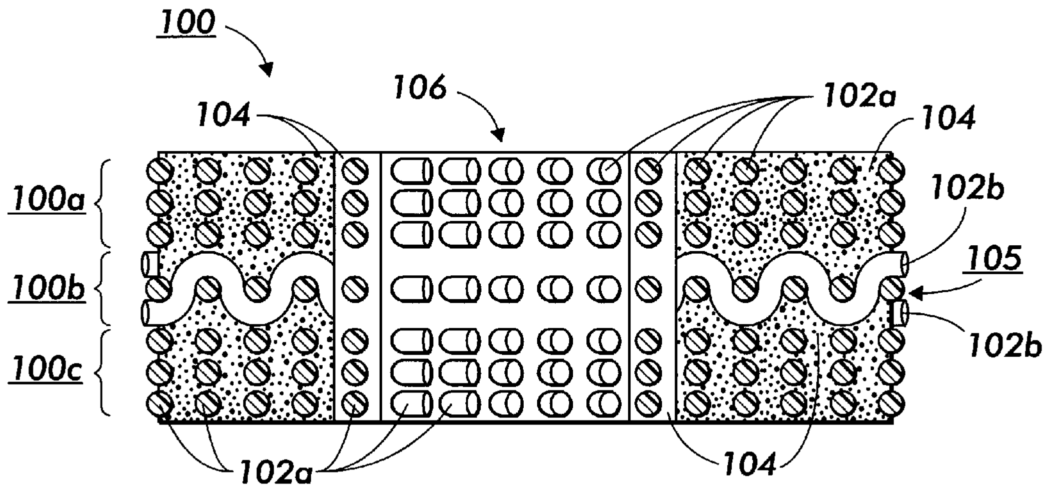
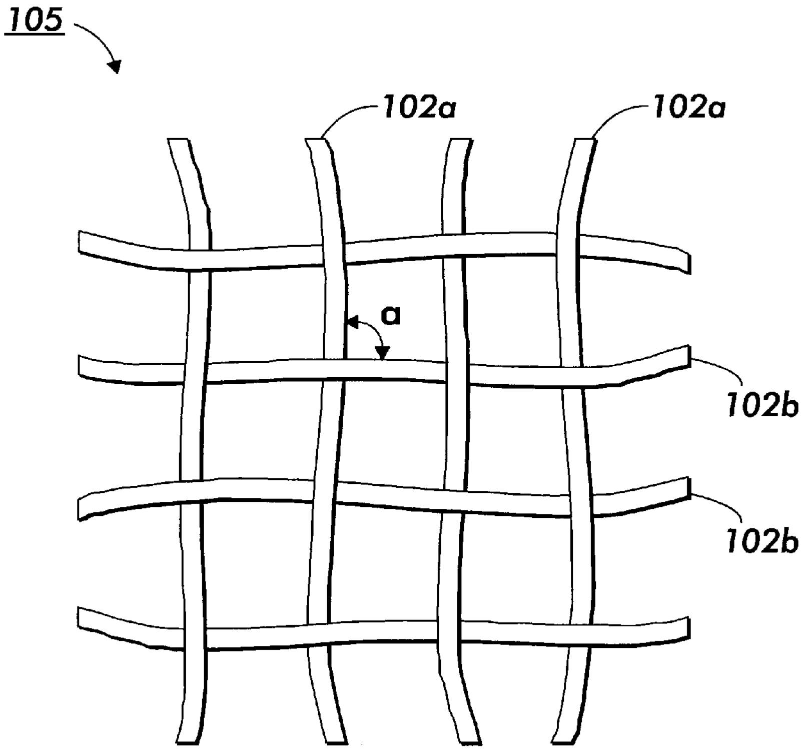
FIG. 7

ELECTRICAL COMPONENT HAVING FIBERS ORIENTED IN AT LEAST TWO DIRECTIONS

FIELD OF THE INVENTION

This invention relates to an electrical component for use in transferring electrical charge, particularly in an electrostatographic printing machine.

BACKGROUND OF THE INVENTION

Typical of the type of machines which may use electrical contacts and devices are electrostatographic printing machines. In commercial applications of such printing machines it is necessary to distribute electrical power and/or logic signals to various sites within the machines. Traditionally, this has required conventional wires and wiring harnesses in each machine to distribute power and logic signals to the various functional elements in an automated machine. In such distribution systems, it is necessary to provide electrical connectors between the wires and components. In addition, it is necessary to provide sensors and switches, for example, to sense the location of copy sheets, documents, etc. Similarly, other electrical devices such as interlocks, and the like are provided to enable or disable a function. These electrical devices are usually low power operating at electronic signal potentials up to 5 volts and at currents in the milliamp regime. Further, many commercial applications employ electrical contact components and related devices that require use in higher power applications employing currents in the regime of 1–100 amps and voltages greater than 5 volts. The present invention is neither limited to signal level currents nor low potential applications and includes applications in higher power regimes requiring greater current carrying capacity.

The major problem addressed by the present invention involves the fact that the inventor has encountered cracking of certain electrical components made by the pultrusion process. These electrical components were fabricated from carbon fiber loaded, pultruded composite plastic into the configuration of washers or slip rod contacts using waterjet or laser cutting processes. Cracking of thin, flat, pultruded bars (for example, less than 2 millimeters thick) along one primary axis has been observed, which the inventor believes is related to insufficient reinforcement of one, or more, secondary axes. The present invention solves the cracking problem by providing an electrical component having increased transaxial strength. Transaxial strength is measured in a direction perpendicular to the pultrusion process.

Conventional electrical components are disclosed in Bell et al., U.S. Pat. No. 5,794,100, Swift et al., U.S. Pat. No. 5,599,615; Orlowski et al., U.S. Pat. No. 5,270,106; Swift et al., U.S. Pat. No. 5,250,756; and Swift et al., U.S. Pat. No. 5,139,862.

Joseph A. Swift, U.S. application Ser. No. 08/919,657 the disclosure of which is totally incorporated herein by reference, discloses an electrical component where the electrically conductive fibers are in a matrix composed of MODAR 826HT™.

SUMMARY OF THE INVENTION

In embodiments, there is provided an electrical component comprising: a plurality of long fibers and a matrix, wherein at least one of the fibers is electrically conductive, wherein the plurality of long fibers includes a first fiber group extending in a manner generally parallel to a first axis, and a second fiber group extending in a manner generally parallel to a different second axis.

In other embodiments, there is provided an electrical component comprising:

(a) a first layer including a plurality of electrically conductive long fibers in a matrix, wherein the first plurality of fibers extends in a manner generally parallel to a first axis;

(b) a second layer including a fabric comprised of a first set of fibers generally parallel to the first axis and a second set of fibers generally parallel to a different second axis; and (c) a third layer including a plurality of electrically conductive long fibers in a matrix, wherein the plurality of fibers extends in a manner generally parallel to the first axis.

In further embodiments of the electrical component, there is provided additional layers:

(d) a fourth layer, beneath the third layer, including a fabric comprised of a first set of fibers generally parallel to the first axis and a second set of fibers generally parallel to the different second axis; and (e) a fifth layer including a plurality of electrically conductive long fibers in a matrix, wherein the plurality of fibers extends in a manner generally parallel to the first axis.

BRIEF DESCRIPTION OF THE DRAWINGS

Other aspects of the present invention will become apparent as the following description proceeds and upon reference to the Figures which represent preferred embodiments of the present invention:

FIG. 6 is a cross-sectional elevational view of another embodiment of the present invention;

FIG. 7 is a schematic, plan view of a fabric that can be used in the fabrication of the present electrical component.

Unless otherwise noted, the same reference numeral in different Figures refers to the same or similar feature.

DETAILED DESCRIPTION

Figure 8:
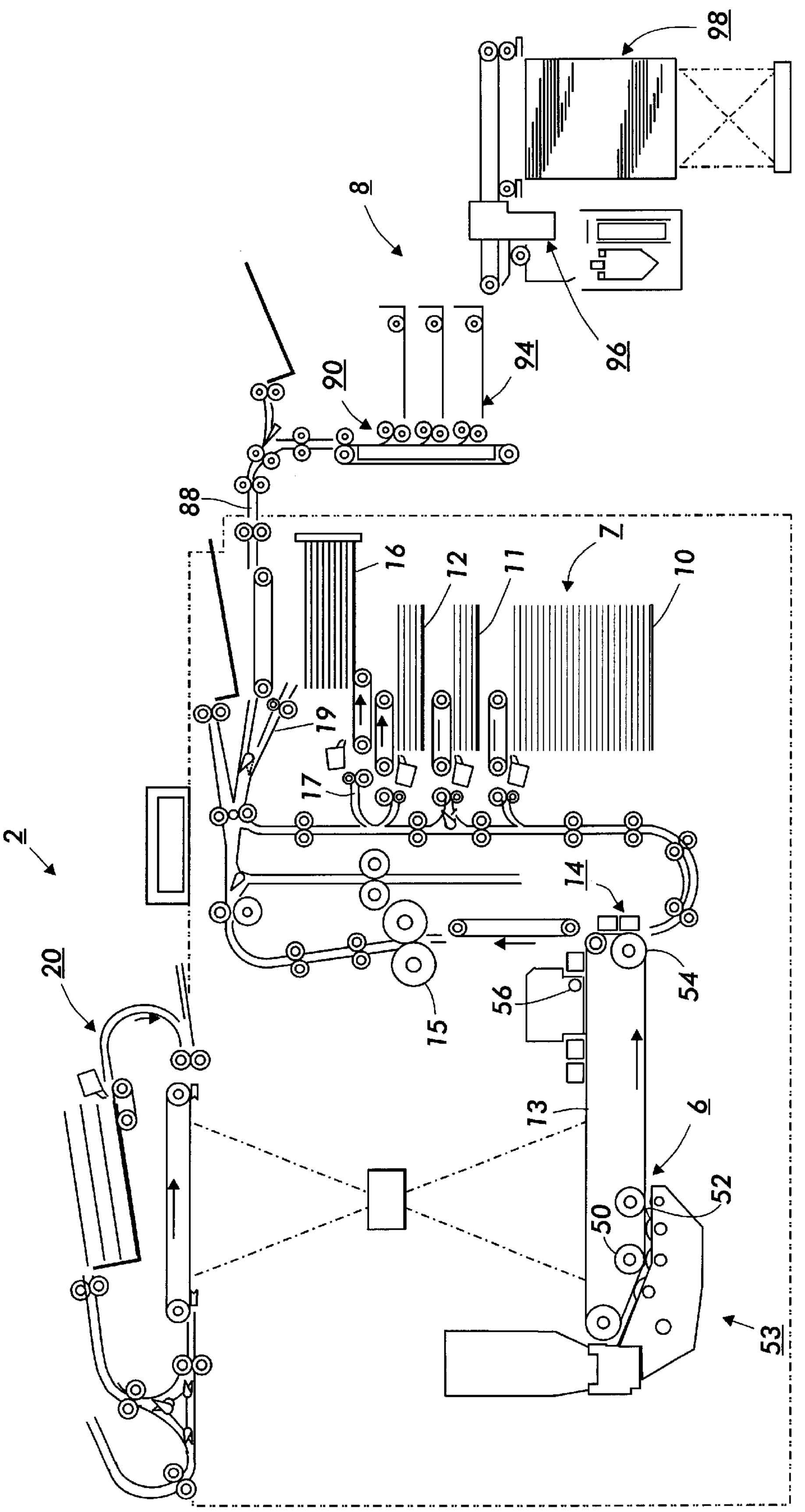
FIG. 8 is a schematic, elevational view of a printing machine incorporating the present electrical component.

Inasmuch as the art of electrostatographic processing is well known, the various processing stations employed in a typical electrostatographic copying or printing machine of the present invention will initially be described briefly with reference to FIG. 8. It will become apparent from the following discussion that the present invention is equally well suited for use in a wide variety of other electrophotographic or electronic printing systems, as for example, ink jet, ionographic, laser based exposure systems, etc.

In FIG. 8, there is shown, in schematic form, an exemplary electrophotographic copying system 2 for processing, printing and finishing print jobs in accordance with the teachings of the present invention. For purposes of explanation, the copying system 2 is divided into a xerographic processing or printing section 6, a sheet feeding section 7, and a finishing section 8. The exemplary electrophotographic copying system 2 incorporates a recirculating document handler (RDH) 20 of a generally known type, which may be found, for example, in the well known Xerox Corporation model "1075", "5090" or "5100" duplicators.

Since the copy or print operation and apparatus of the present invention is well known and taught in numerous patents and other published art, the system will not be described in detail herein. Briefly, blank or preprinted copy sheets are conventionally provided by sheet feeder section 7, whereby sheets are delivered from a high capacity feeder tray 10 or from auxiliary paper trays 11 or 12 for receiving a copier document image from photoreceptor 13 at transfer station 14. In addition, copy sheets can be stored and delivered to the xerographic processing section 6 via auxiliary paper trays 11 or 12 which may be provided in an independent or stand alone device coupled to the electrophotographic printing system 2. After a developed image is transferred to a copy sheet, an output copy sheet is delivered to a fuser 15, and further transported to finishing section 8 (if they are to be simplex copies), or, temporarily delivered to and stacked in a duplex buffer tray 16 if they are to be duplexed, for subsequent return (inverted) via path 17 for receiving a second side developed image in the same manner as the first side. This duplex tray 16 has a finite predetermined sheet capacity, depending on the particular copier design. The completed duplex copy is preferably transported to finishing section 8 via output path 88. An optionally operated copy path sheet inverter 19 is also provided.

Output path 88 is directly connected in a conventional manner to a bin sorter 90. Bin sorter 90 includes a vertical bin array 94 which is conventionally gated (not shown) to deflect a selected sheet into a selected bin as the sheet is transported past the bin entrance. An optional gated overflow top stacking or purge tray may also be provided for each bin set. The vertical bin array 94 may also be bypassed by actuation of a gate for directing sheets serially onward to a subsequent finishing station. The resulting sets of prints are then discharged to finisher 96 which may include a stitcher mechanism for stapling print sets together and/or a thermal binder system for adhesively binding the print sets into books. A stacker 98 is also provided for receiving and delivering final print sets to an operator or to an external third party device.

The electrical contact (also referred herein as electrical component) for providing sliding motion, including rotary motion to the elements according to the present invention may be utilized in a varying number of applications within the printing machine 2. These applications include any element within the machine which requires a charge or an electrical bias to optimally perform. For example, an electrical charge can be provided to photoconductive belt 13 through backup roll 50. The electrical component of the subject invention thus may be utilized on the backup roll 50.

Also, electrical bias can be transferred through developer roll 52 within developer unit 53. Likewise, the electrical contact of the present invention may be utilized to transfer electrical charge through the developer roll 52. Stripping roll 54 may likewise use the electrical contact to transfer electrical charge across the roll 54. Further, cleaning brush 56 may utilize the electrical contact to transfer electrical charge through the cleaning brush 56.

It should be appreciated that the locations of the backup roll 50, developer roll 52, stripping roll 54 and cleaning brush 56 are merely examples of the possible applications for the electrical contact of the present invention. It should be appreciated that the electrical contact may be used anywhere where an electrical charge needs to be transferred between a moving, sliding, or rotating element and an adjacent fixed element as disclosed in Bell et al., U.S. Pat. No. 5,794,100, the disclosure of which is totally incorporated herein by reference.

The electrical contact of the present invention provides for greatly improved reliability, low cost and easy manufacture and are highly suitable to operate in low energy circuits. Typically these devices are low energy devices, using voltages within the range of millivolts to kilovolts. They may also use currents within the range of microamps to milliamps as opposed to high power applications that normally employ tens to hundreds of amperes at very high voltages, for example. Typically these devices are used where concern for the power dissipated at the interfacial surfaces is negligible, for example, in the cases where high voltages (in kilovolts) are coupled with microampere currents, or, at low voltage, i.e., logic levels and currents in the tens of milliampere range. Although the present invention may be used in certain applications in the single amp to tens of amps region it is noted that preferred results are obtained in high or low voltage, low energy circuitry where power losses can be tolerated. It is also noted that these devices may be used in certain applications in the high voltage region in excess of 10,000 volts, for example, where excessive heat is not generated. These devices can be characterized as generally electronic in nature within the generic field of electrical devices meaning that their principle applications are in certain low power applications where their inherent power losses may be tolerated.

Preferably, the electrical contact is made from a pultruded composite member and may have a fibrillated brush-like structure at one end (other regions of the composite member may have the fibrillated brush-like structure) which provides a densely distributed filament contact when mated with another component. By the term densely distributed filament contact it is intended to define an extremely high level of contact redundancy insuring electrical contact with another contact surface in that the contacting component has in excess of about 1000 individual conductive fibers per square millimeter.

In accordance with a preferred embodiment of the invention, the use of a pultrusion of the type having a plurality of conductive fibers carried within a host matrix (sometimes referred to as a distributed fiber pultrusion) serving as electrical contacts is advanced. Rigid and sliding contacts employing this feature can be fabricated at very low cost. Due to the inertness and reliability of the distributed fiber contact, many new device configurations, which otherwise would have used metal contacts in open air and therefore would have been judged to be unreliable, can be now enabled. With the realization that a pultruded carbon material can be used as both a contact member and a structural component, it becomes apparent that these features can be combined into a multiple function device thereby enabling even higher value-added devices. This is particularly the case that is enabled by the combination of high electrical contact reliability and higher strength and durability provided by the present invention.

Such contacts can serve a variety of applications within a xerographic engine and its peripherals, all enabled by pultruded carbon fiber bars, tubes, rods or sheets which are ordinarily rigid but through laser cutting and heating can expose conductive regions that are flexible and can be easily contacted for electrical connections as below described in detail.

Thus, in accordance with the present invention, an improved electrical contact device is provided that is of improved mechanical strength (particularly in an orientation perpendicular to the pultrusion direction), durability, and reliability, while being low in cost and easily manufacturable. These advantages are enabled through the use of a manufacturing process known generally as a pultrusion process, with the fibrillation of at least one end of the pultrusion. One pultrusion composition that can be employed in practicing this invention is of the type that comprises continuous strands of electroconductive carbon fiber filler in various desired orientations with respect to a defined axis within a host polymer. Such carbon fiber pultrusions are a subcategory of high performance conductive composite plastics, and may comprise one or more types of continuous, conductive reinforcing filaments in a binder polymer. They provide a convenient way to handle, process and use fine diameter, carbon or other conductive fibers without the problems typically encountered with free conductive fibers.

The pultrusion process generally consists of pulling continuous lengths of fibers first through a resin bath or impregnator, then into a preforming fixture where the resulting section is at least partially shaped and excess resin and/or air are removed. The section is then pulled into heated dies where it is continuously cured to solidify the distributed fiber pultruson. For a detailed discussion of pultrusion technology, reference is directed to Handbook of Pultrusion Technology" by Raymond W. Meyer, first published in 1985 by Chapman and Hall, N.Y.

More specifically, in the practice of the invention, conductive carbon fibers are submersed in a polymer bath and drawn through a die opening of suitable shape at high temperature to produce a solid piece having dimensions and shapes of that of the die. The solid piece can then be cut, shaped, or machined. As a result, a solid piece can be achieved that has thousands of conductive fiber elements contained within the polymer matrix, where the ends of the fiber elements can be exposed to provide electrical contacts. The very large redundancy and availability of electrical contacts enables a substantial improvement in the reliability of such devices.

Since the plurality of small diameter conductive fibers are pulled through the polymer bath and heated die as a continuous length, the shaped member can be formed with the fiber being continuous from one end of the member to the other. Accordingly, the pultruded composite may be formed in a continuous length during the pultrusion process, then cut to any suitable dimension, with a very large number of electrical contacts provided at each end. Subsequently such pultruded composite members may have any desired region, such as either one or both of its ends fibrillated to remove some, or all, of the polymer from a given length of fiber.

A feature of the present invention is that the pultrusion process is modified to include one or more layers of a fabric in addition to the previously described unidirectional carbon fiber. Preferably, the fabric consists of high strength, continuous strand 1 k, 3 k, 6 k or 12 k carbon fiber in the warp and filling directions of a plain weave fabric. Alternately, the carbon fiber can comprise only the warp direction or the filling direction of a plain weave fabric. The width of the fabric is selected to be approximately equal, or slightly less than, the width of the pultruded composite. The thickness of a single layer of the fabric is selected to be in the range of about 0.05 millimeters to about 1.0 millimeters and preferably in the range of about 0.10 to about 0.30 millimeters for pultruded composites having thickness in the range of 1.0 to 3.0 millimeters. In this manner, the relative contribution of the fabric thickness, regardless of the total thickness of the pultruded composite, is in the range of about 0.5 to about 50% and preferably from about 3 to about 30% to that of the total thickness. One, or more fabric layers are continuously fed into the resin bath carried along with, and perhaps sandwiched between, layers of unidirectional fiber then pulled into and through the heated die in similar earlier-described manner to form the fabric-reinforced, distributed fiber pultrusion of the present invention.

The fabric may be a woven material composed of the electrically conductive fibers described herein. In embodiments, the fabric may be composed of nonelectrically conductive fibers such as fiberglass, ceramic, nylon, NOMEX™, KEVLAR™, polyester, polyimide, acrylic, wool, cellulose, rayon, or other organic, or copolymers thereof, or inorganic fibers, or blends or mixtures thereof.

Any suitable fiber having a suitable resistivity may be used in the practice of the invention. Typically, the conductive fibers are metallic or nonmetallic and have a DC volume resistivity of from about $1\times10^{-5}$ to about $1\times10^{+11}$ ohm-cm and preferably from less than about $1\times10^{-5}$ to about 10 ohm-cm to minimize losses and suppress arcing, sparking, electromagnetic interference, and radio frequency interference. The upper range of resistivities of up to about $1\times10^{+11}$ ohm-cm could be used, for example, in those special applications involving extremely high fiber densities where the individual fibers act as individual resistors in parallel and to prevent arcing thereby lowering the overall resistance of the pultruded member while enabling current conduction. Higher resistivity materials may be used if the input impedance of the associated electronic circuit is sufficiently high. The vast majority of applications however, will require fibers having resistivities within the above stated preferred range to enable efficient current conduction. The term "nonmetallic" is used to distinguish from conventional metal-wire fibers which exhibit metallic conductivity having resistivity of the order of 1×10–6 ohm-cm and to define a class of fibers which are nonmetallic but can be treated in ways to approach or provide metal-like properties. However, carbon fibers are particularly well suited as the preferred fiber because they are chemically and environmentally inert, possess high strength and stiffness, can be tailored to virtually any desired resistivity, and exhibit a negative coefficient of thermal resistivity. Further, they are easily compounded with a wide variety of thermoplastic and thermosetting resins into high strength composites.

In addition, the individual conductive fibers can be made circular in cross section with a diameter generally in the order of from about 4 to about 50 micrometers and preferably from about 5 to 10 micrometers. This provides a very high degree of fiber redundancy in a small cross sectional area. Thus, as contact materials, the large number of fibers provide a multiple redundancy of contact points, for example, in the range between about $0.05\times10^{+5}$ and $5\times10^{+5}$ contacts/$cm^2$. This is believed to enable ultrahigh contact reliability. It should be appreciated that blends of fibers having different sizes are possible.

The fibers are typically flexible and compatible with the polymer systems within which they are carried. Typical fibers may include carbon, carbon/graphite, metalized or metal coated carbon fibers, metal coated glass, metal coated ceramic, carbon filled polymer, polyacetylene filled polymer, polyaniline filled polymer and metal coated polymeric fibers. A particularly preferred class of fibers that may be used are those fibers that are obtained from controlled heat treatment process to yield complete or partial carbonization of polyacrylonitrile (PAN) precursor fibers. Other suitable fibers may include poly(p-phenylene benzobisoxoazole) (PBO) fiber. It has been found for such fibers that by carefully controlling the temperature of carbonization within certain limits that precise electrical resistivities for the carbonized carbon fibers may be obtained. The carbon fibers from polyacrylonitrile (PAN) precursor fibers are commercially produced by Graphil, Inc., Amoco Performance Products, Inc., and others in yarn bundles of 1,000 to 160,000 filaments commercially referred to as "Tows." Metal plated carbon fibers are available from Novamet Specialty.

One of the advantages of using conductive carbon fibers is that they have a negative coefficient of thermal conductivity so that as the individual fibers become hotter with the passage of, for example, a spurious high current surge, they become more conductive. This provides an advantage over metal contacts as the coefficient of thermal conductivity of metals operate in just the opposite manner and therefore metal contacts tend to burn out or self destruct. The carbon fibers have the further advantage in that their surfaces are inherently rough and porous thereby providing good adhesion to the polymer matrix. In addition, the inertness of the carbon material yields a contact surface relatively immune to the typical contaminants of that affected metal.

The carbon fibers are enclosed in any suitable polymer matrix. The polymer matrix should be of a resin binder material that will volatilize rapidly and cleanly upon direct exposure to the laser beam during laser processing below described. Polymers such as low molecular weight polyethylene, polypropylene, polystyrene, polyvinylchloride, and polyurethane may be particularly advantageously employed. Polyesters, epoxies, vinyl esters, polyetheretherketones, polyetherimides, polyethersulphones and nylon are in general, suitable materials with the cross-linkable polyesters and vinylesters being preferred due to their short cure time, relative chemical inertness and suitability for laser processing.

One suitable matrix employed in the present invention may be polymerized from a composition including methyl methacrylate monomer (referred herein as "MMA") and a trimer (referred herein as "trimer") of hydroxyethyl methacrylate, diphenylmethane diisocyanate, and hydroxyethyl methacrylate. The MMA has the structural formula

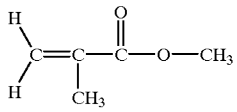

and the trimer has the structural formula

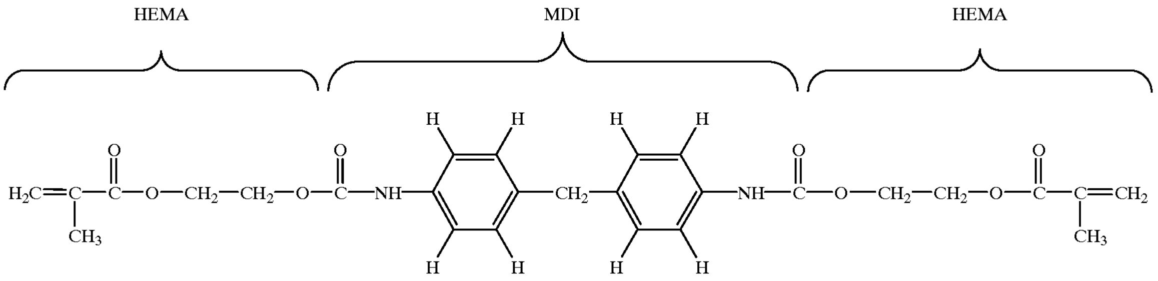

where HEMA is hydroxyethyl methacrylate and MDI is diphenylmethane diisocyanate. The MMA and the trimer preferably have a molar ratio ranging from about 7:1 to about 1:1, more preferably from about 5:1 to about 2:1, and especially about 4:1. The MMA and the trimer together may be present in an amount ranging from about 80% to about 97% by weight based on the matrix composition weight. The remaining substances, about 3% to about 20% by weight, may be for example other monomers or additives described herein.

One preferred matrix is MODAR 826HT™ resin wherein the MMA and the trimer are believed to have the molar ratio of about 4:1. The composition of MODAR 826HT™ resin is believed to be MMA (present in about 42% by weight), the trimer (present in about 50–55% by weight), and in addition there may be included an acrylic polymer (such as polymethyl methacrylate, present in about 1–5% by weight), flame retardants, for example alumina trihydrate, and small amounts of absorbed moisture (present in about 0.1 to 1.0% by weight).

Another preferred matrix is MODAR 816™ resin available from Ashland Chemical Company which is an acrylic modified polyester that is believed to contain methyl methacrylate monomer that is crosslinked with a urethane vinyl ester in the presence of benzoyl peroxide.

Other materials may be added to the matrix to provide properties such as lubricants, corrosion resistance, adhesion enhancement, or additional flame retardancy as desired. In addition, the polymer bath used to make the subject pultruded composite may contain fillers such as calcium carbonate, alumina, silica or pigments to provide a certain color, texture, or lubricants to reduce friction, for example, in sliding contacts. Further additives to alter the viscosity, surface tension or to assist in cross linking or in bonding the pultrusion to the other materials may be added. Naturally, if the fiber has a sizing applied to it, a compatible polymer should be selected. For example, if an epoxy resin is being used, it would be appropriate to add an epoxy sizing to the fiber to promote adhesion between the resin and the fibers.

The fiber types and loadings in the polymer matrix depends upon the conductivity and density of fiber contact points desired as well as on the cross-sectional area and other mechanical, physical, chemical, and magnetic properties of the final configuration. Typically, the unfilled polymeric matrix has a specific gravity of from about 1.1 to about 1.5 grams per cubic centimeter, while the carbon, metalized carbon, and polymeric type fibers have a specific gravity of from about 1.5 to about 2.2. Naturally, the specific gravity of metal and metal alloy fibers is much higher, for example, 6.0 to about 9.0. Typically, very high fiber concentrations, for example greater than 50% by weight and often greater than 75% by weight, are characteristic of the pultrusion process which requires a minimum overall fiber loading determined by factors such as; the shape, size and complexity of the pultruded component as well as the polymer type and viscosity, die design, process velocity and temperature. While the conductive fibers, for example, carbon fibers may be present in amounts as low as 1 to 5% by weight of the pultruded component to control the electrical conductivity of the composite at a prescribed low level, for example 1×10−1 ohm-cm, other non-conductive fibers, such as fiberglass fibers may be added to comprise the minimum requirements called for by the pultrusion process. In general, pultrusions with high loadings of carbon fiber are preferred to provide pultruded composites with the combination of high electrical conductivities, high densities of fiber contact tips, and desirable mechanical and other properties.

Illustrative amounts for the various materials employed in the electrical component are as follow (the percentages by weight are based on the total weight of the electrical component):

(a) matrix: about 4% to about 40% by weight, preferably about 15% to about 30% by weight.

(b) first fiber group (total of all 102*a* fibers): about 30% to about 95% by weight, preferably about 50% to about 80% by weight:

(i) portion of first fiber group corresponding to unidirectional fibers, about 30% to about 70% by weight, preferably from about 50% to about 70% by weight;

(ii) portion of the first fiber group corresponding to warp fibers of fabric: about 0.5% to about 50% by weight, preferably from about 2% to about 20% by weight; and (c) second fiber group (102*b* fibers): about 0.5% to about 50% by weight, preferably from about 2% to about 20% by weight.

A preferred electrical component has the following composition:

(1) About 21 to about 28% by weight of MODAR 816™ (embodiment of matrix);

(2) About 68 to about 71% by weight of carbon fiber reinforcement (embodiment of the first fiber group), where the majority (about 64 to about 67% by weight) is unidirectional 12,000 high strength PAN tow (from Amoco as T-300 or from Graphil) and a smaller portion (about 4 to about 8% by weight) is axially oriented 3,000 high strength PAN carbon fiber tow contained as the warp (warp is a term used in the textile industry to denote those fibers aligned in the process direction of the weaving process in a bidirectional woven fabric. The 12,000 tow unidirectional fibers and the fibers comprising the warp of the fabric are aligned parallel to the pultrusion direction and axially with the pultruded electronic component; and (3) About 4 to about 8% by weight of off-axis aligned 3,000 high strength PAN carbon fiber tow (embodiment of the second fiber group) composed of the filling (filling is the term used in the textile industry to denote those fibers that run crosswise or at right angles to the warp fibers) in the bidirectional woven fabric of item (2). The fabric is available from Mutual Industries as Ml 1012 3K Bidirectional fabric. The above weights are based on the weight of the electrical component.

A laser (not shown) can be used to both cut individual components for use as electrical contacts. For example, a focused $CO_2$, 50 to 500 watt, continuous wave laser can be used to cut the pultrusion and simultaneously volatilize the binder resin in a controlled manner for a sufficient distance back from the cut to produce in one step a distributed filament contact. The length of exposed carbon fiber can be controlled by the laser power, position of focus and cut rate. Various cut edge shapes can be achieved by changing the laser incidence angle.

Thus, a suitable pultrusion can be cut by laser techniques to form a contact of desired length from the longer pultrusion length, and one or more regions can be fibrillated to provide a high redundancy fiber contact member downstream for contact to electrically circuitry to be powered, biased, grounded or switched, and a high redundancy fiber contact upstream to contact a power source, ground potential, switch, or sensor contact plate. Any suitable laser can be used whose energy will be absorbed by the matrix of the host polymer, so that the host polymer will be volatilized. Specific lasers which may be used include a carbon dioxide laser, carbon monoxide laser, the YAG laser, frequency multiplied YAG laser, or the excimer laser. The carbon dioxide laser mentioned is particularly suited for this application, since it is highly reliable, well suited for polymer matrix absorption, and is highly economical in manufacturing environments.

Figure 4:
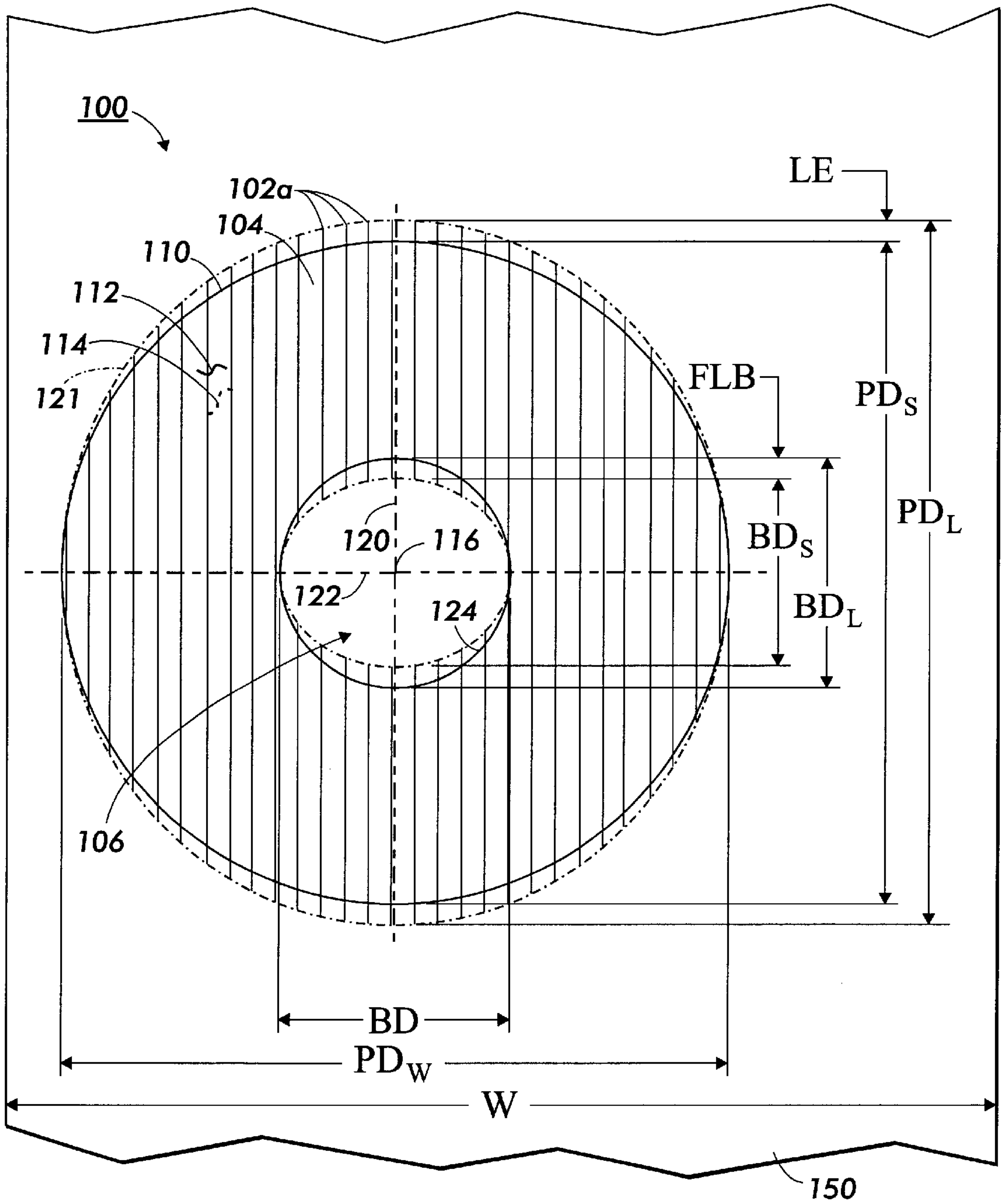
FIG. 4 is a plan view of a blank used to manufacture the device of FIG. 1 showing the cutter path for manufacturing in phantom.

According to the present invention and referring to FIG. 4, a carbon fiber electrical contact 100 in the form of a washer is shown, which is cut from the blank 150. As described in greater detail earlier, the electrical contact 100 is made from a pultruded composite member and has a fibrillated brush like structure on the bore or inner diameter 124. The brush like structure provides a densely distributed filament contact with the shaft or other mating component. The composite member includes a plurality of conductive fibers 102 which are carried within a host matrix 104. In FIG. 4, only 102*a* fibers are depicted in FIG. 4 for convenience. The host matrix 104 may together with the conductive fibers 102 also be called a distributed fiber pultrusion. The fibers 102 may be carbonized polyacrylonitrile (PAN) fibers.

For simplicity, in the Figures and in the specification unless otherwise indicated, the reference to fibers 102 includes both first fiber group 102*a* and second fiber group 102*b*.

The electrical contact 100 may have any suitable shape and corresponding features shown herein to include an aperture 106 therein for an electrical contact with a rotating member, for example, a shaft, (not shown). The electrical contact 100 also includes an outer periphery 110 thereof. While the electrical contact may have any suitable shape, the contact 100 is preferably in the form of a washer having first and second parallel faces 112 and 114 which are spaced apart by a thickness dimension.

Electrical contact may be had between the contact 100 and the housing (not shown) in any suitable fashion. For example, the electrical contact 100 may be in contact with the housing against either surface 112 or surface 114. Alternatively, the electrical contact 100 may have contact with the housing along the outer periphery 110. Preferably, however, electrical contact between the contact 100 and the housing occurs with fibers 102 in contact with the housing. It should be appreciated that alternatively, the electrical contact may be had by the use of a piercing contact (not shown) to pierce into the electrical contact 100 and thereby contacting a plurality of the fibers 102.

Referring again to FIG. 1, the fibers 102*a* in the matrix 104 are aligned in a parallel direction along fiber axis 120. The fibers 102*b* are aligned in a direction parallel to perpendicular axis 122. Since the fibers 102 have a decomposition temperature above that of matrix 104, heat may be applied to the contact 100 at any suitable location to expose the fibers 102 from the matrix 104. These fibers 102, when heated along the periphery 110, may thus contact the housing thereby improving the electrical contact therebetween.

Similarly, the fibers 102 may be exposed from the matrix 104 about the aperture 106 thereby improving the electrical contact between the contact 100 and the rotating member.

As used herein, the phrase long fibers denotes those fibers that have a sufficient length to allow physical alignment of their orientation along a desired axis during the fabrication of the electrical component. The phrase long fiber is meant to define fibers comprising a length dimension that is substantially greater than either a radius dimension (if circularly shaped) or any other dimension relating to the width or thickness of the fiber. In this light, ratios of fiber length to fiber radius, or fiber length to fiber thickness, in the range of greater than about 10 to about 1000, or preferably in the range of about 1,000 and higher are a feature of the present invention. The fabric described herein is composed of at least two sets of long fibers.

The phrase generally parallel as applied to the fibers indicates that the fibers may not be perfectly straight (see for instance FIG. 7 for an illustration) along the length of the fibers, but that the overall lengthwise orientation of the fibers is along a particular axis.

Figure 5:
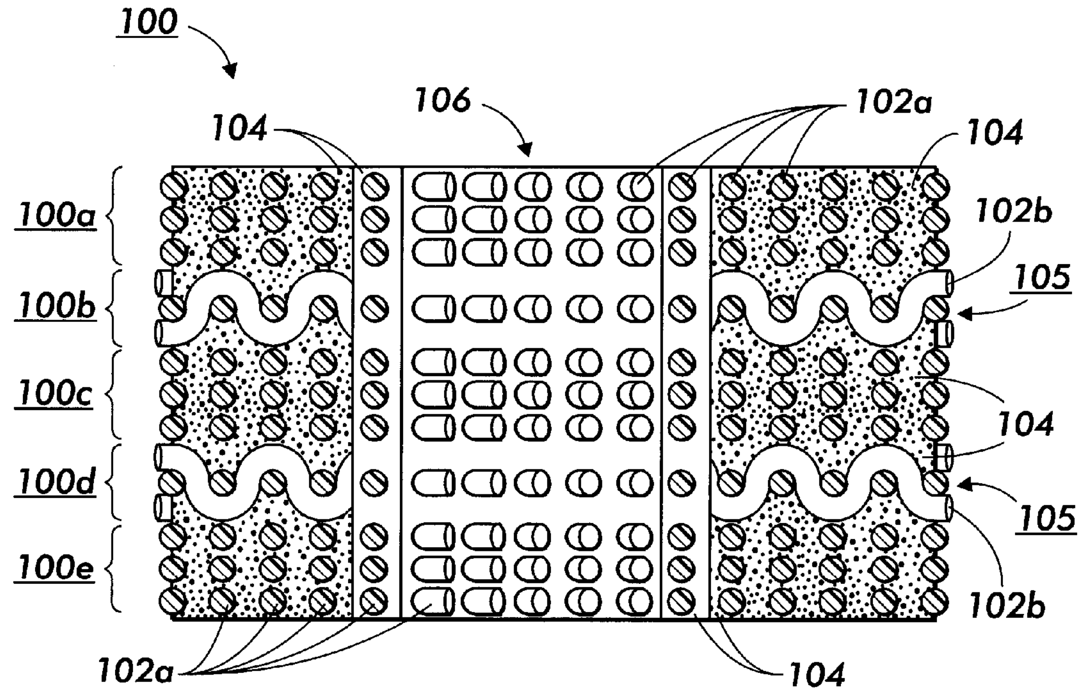
FIG. 5 is a cross-sectional elevational view of the device of FIG. 1 where for convenience, first element 130 and rotating element 132 are not shown.

As seen in FIG. 5, the electrical component 100 in one embodiment is composed of:

(a) a first layer 100*a* including a plurality of electrically conductive long fibers 102*a* in a matrix 104, wherein the first plurality of fibers 102*a* extends in a manner generally parallel to a first axis 120;

(b) a second layer 100*b* including a matrix 104 and a fabric 105 composed of a first set of fibers 102*a* generally parallel to the first axis 120 and a second set of fibers 102*b* generally parallel to a different second axis 122;

(c) a third layer 100*c* including a plurality of electrically conductive long fibers 102*a* in a matrix 104, wherein the plurality of fibers 102*a* extends in a manner generally parallel to the first axis 120;

(d) a fourth layer 100*d*, beneath the third layer 100*c*, including a matrix 104 and a fabric 105 having a first set of fibers 102*a* generally parallel to the first axis 120 and a second set of fibers 102*b* generally parallel to the different second axis 122; and (e) a fifth layer 100*e* including a plurality of electrically conductive long fibers 102*a* in a matrix 104, wherein the plurality of fibers 102*a* extends in a manner generally parallel to the first axis 120. Please note that the matrix 104 may be present or absent in second layer 100*b* and in the fourth layer 100*d* depending upon the fabrication technique for the electrical component. Preferably, matrix 104 is present in layers 100*b* and 100*d*.

In a second embodiment depicted in FIG. 6, the electrical component 100 contains only three layers (100*a*, 100*b*, and 100*c*), the composition of each of these layers being described herein. For the three layer embodiment of FIG. 6, the fabric 105 is composed of all the fibers 102*b* and only those fibers 102*a* in the second layer 100*b*.

As described herein, the electrical component has a region that is at least substantially free or totally free of the matrix. In FIGS. 5 and 6, sections of the 102*b* fibers that are free of matrix are shown on the inner diameter 124 and outer periphery 110.

For convenience during fabrication, the various layers (100*a*, 100*b*, 100*c*, 100*d*, 100*e*) as shown in the Figures contain long fibers that are only oriented in one or two axes. In other embodiments of the present invention, however, each layer may include long fibers oriented in one, two, three or more additional axes. For example, layers (100*a*, 100*c*, 100*e*) can include long fibers oriented in at least two axes and layers (100*b*, 100*d*) can include long fibers oriented in at least three axes. The orientation of the additional axes can be at any suitable angle described herein.

In the present invention, the layers (100*a*, 100*c*, 100*e*) can have the same or different composition from each other. Layers (100*b*, 100*d*) can have the same or different composition from each other. Thus, for example, the same or different matrix material can be selected for the various layers; in addition, the same or different fiber material can be selected for the various layers. Preferably, short fibers are absent from the layers and the only fibers present in the layers are long fibers.

Any suitable number of the fibers in the electrical component is electrically conductive. For example, only one or all of the fibers (102*a*, 102*b*) may be electrically conductive. In other embodiments, only the fibers 102*a* or the fibers 102*b* are electrically conductive. In additional embodiments, a portion of the fibers is electrically conductive such as only those fibers in selected layer or layers. For instance, only the fibers 102*a* in layer 100*a* may be electrically conductive.

FIG. 7 illustrates a fabric 105 that can be used in the fabrication of the electrical component. The fabric 105 contains at least two sets of fibers: fibers 102*a* that extend in a manner generally parallel to the first axis 120, and fibers 102*b* that extend in a manner generally parallel to the second axis 122. Fibers 102*a* and fibers 102*b* are angled from one another by an angle a for instance of at least about 15 degrees, preferably from about 45 to about 135 degrees, and especially about 90 degrees. In addition, combinations of fibers having more than one orientation angle within the fabric layer are possible. For example, a percentage of the 102*b* fibers may be present at a substantially different angle, for instance, 45 degrees, while the balance may have an angle orientation of 90 degrees or 135 degrees. The fibers in the fabric 105 can exhibit no weave, plain weave, a satin weave (e.g., the filling fibers float over two or more warp fibers), or a basket weave.

The electrical component 100 may be made by compression molding, molding, thermal forming, extrusion, pultrusion, or a combination of the above. In preferred embodiments, the electrical component 100 is made in any suitable process capable of manufacturing the pultruded carbon fiber electrical component of the present invention as described herein. Preferably, however, the material is pultruded in sheets in the direction of axis 120. The sheets have a thickness equal to the thickness of the component, for example, 0.5 to 5.0 mm.

The pultruded sheets of carbon fiber plus matrix material and the fabric are cut into a shape having a central aperture 106 in any suitable fashion. Preferably, the cut surface will include the electrical contact surface without further processing or modification. Thus, the properties of the desired electrical component are enabled by the cutting method selected. For example, the electrical components may be cut using a water jet, a laser, or even by mechanical cutting. The use of a water jet or an excimer laser will minimize the decomposition of the matrix 104 during cutting of the pultrusion, while the use of a $CO_2$ or CO laser particularly when translating at slow translational speeds may cause a considerable amount of heating decomposition and vaporization of the matrix and thereby exposing the fibers 102.

Referring to FIG. 4, by utilizing a $CO_2$, CO, or other laser cutting device or a similar heat generating cutting device mounted on a machine capable of generating a cutting path 121, for example, a contoured numerical control (CNC) machine which is commercially available. The electrical component 100 can be cut from a long continuous blank 150 having a width W slightly wider than the component 100. The cutting path 121 can be provided to define outer periphery 110 of the electrical component 100. The outer periphery 110 defines an elliptical path having a diameter $PD_L$ along fiber axis 120 and a smaller diameter $PD_W$ along perpendicular axis 122 which is perpendicular to fiber axis 120. The laser cutting device (not shown) is translated very quickly adjacent the perpendicular axis 122 providing for very little decomposition of the matrix 104 and progressively translates slower to its slowest translation point at axis 120. The fibers 102 thus have an exposed length LE which is almost zero adjacent the perpendicular axis 122 and has its maximum length along fiber axis 120. The laser cutting tool is translated along outer periphery 110 at a continuously increasing translational speed from the fiber axis 120 to the peripheral axis 122 and correspondingly around the entire outer periphery 110 of the component 100. The laser thus cuts the matrix 104 into an elliptical outer shape defined by diameter $PD_W$ along the peripheral axis 122 and a diameter $PD_S$ along fiber axis 120. The electrical component 100 thus is suitable for positioning into a housing having a bore with a diameter between diameter $PD_W$ and diameter $PD_L$ so that the fibers 102 are flexed into contact with the housing thereby providing sufficient electrical contact.

Figure 1:
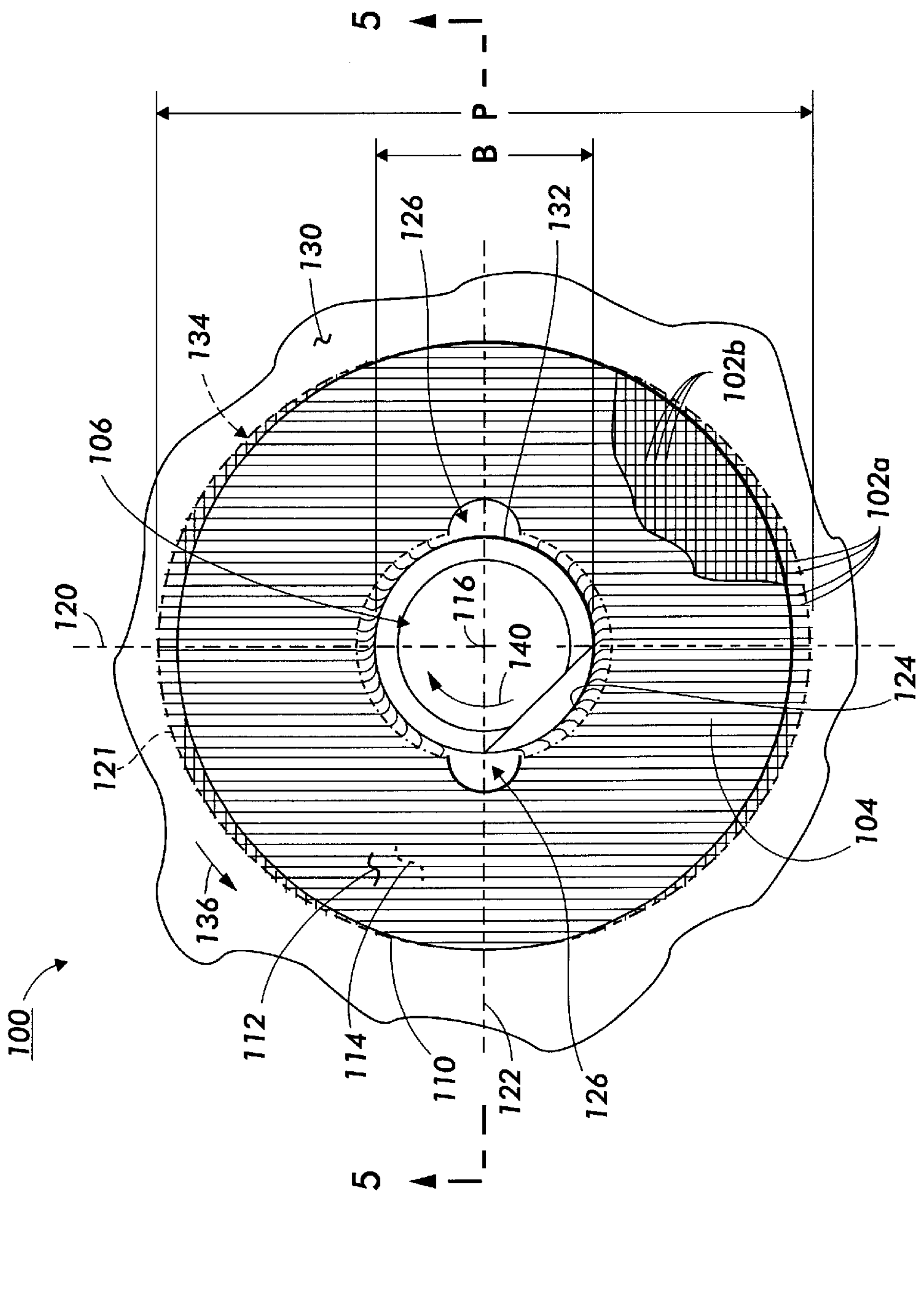
FIG. 1 is plan view of a device having a multiplicity of electrically conductive according to the present invention.

Similar to the outer periphery 110, the aperture 106 is preferably cut with a laser. The laser preferably translated at a fast translational speed adjacent the peripheral axis 122 ended in much slower translational speed adjacent the fiber axis 120 in order to expose the fibers 102 adjacent the fiber axis 120. The aperture 106 is formed by translating the laser in an elliptical path defined by diameter BD along perpendicular axis 122 and $BD_S$ along fiber axis 120. The fibers 102 are thus exposed increasingly to a maximum fiber length FLB adjacent the fiber axis 120. The laser decomposes and vaporizes the matrix 104 so as to form a matrix bore 124 defined by diameter BD at the peripheral axis and diameter $BD_L$ at the fiber axis. The aperture 106 is thus compatible with a rotating member having size between diameter BD and diameter $BD_S$. The fibers 102 are in a flexed and contact position with the rotating member as illustrated in FIG. 1. For the sake of simplification, the foregoing descriptions of the cutting process depict the effect of the laser only upon the unidirectionally oriented fibers 102*a*. Of course, the greater the amount of fibers 102*b* present in the pultrusion, the less elliptical the cutting path 121 and the cutting path $BD_L$ are with respect to a composite having only unidirectional fiber 102*a*. Thus, an advantage of the present invention is that less manipulation of the cutting paths is required to produce the target final dimensions of the part.

Referring again to FIG. 1, preferably, to permit passage of contamination in the direction of axis 116, the component 100 includes channels 126 positioned preferably adjacent to perpendicular axis 122. The channels 126 may have any particular shape and may for example have an arcuate shape. The position of the channels 126 adjacent to the perpendicular axis 122 is preferred in that the the majority of the 102*a* fibers at the positions along the perpendicular axis 122 are aligned such that they cannot effectively serve as brushes for contact with the rotating member.

According to the present invention and referring to FIG. 1, the electrical component 100 is shown in position between a first element 130 contact with outer periphery 110 of the electrical component 100 and a second rotating element 132 located within aperture 106 of the electrical component 100. The first element 130 may be any element to which electrical contact with the rotating element 132 is desired. The first element 130 may be in the form of a housing or structure which includes a bore 134 therein. The bore 134 is defined by a bore diameter P. The outer periphery 110 of the component 100 is matingly fitted to the bore 134. A protrusion (not shown) may be used to avoid relative rotation between the first element 130 and the electrical component 100.

Alternatively, the first element 130 may be in the form of a rotating element rotating in the direction of arrow 136 at a first rotational speed $\Omega_1$. The second element 132 may likewise rotate in the direction of arrow 140 at a second rotational speed $\Omega_2$. The electrical component 100 is suitable for providing contact where the first element 130 and the second 132 rotate in either different rotational speeds in the same direction or in rotations of opposite direction.

Figure 3:
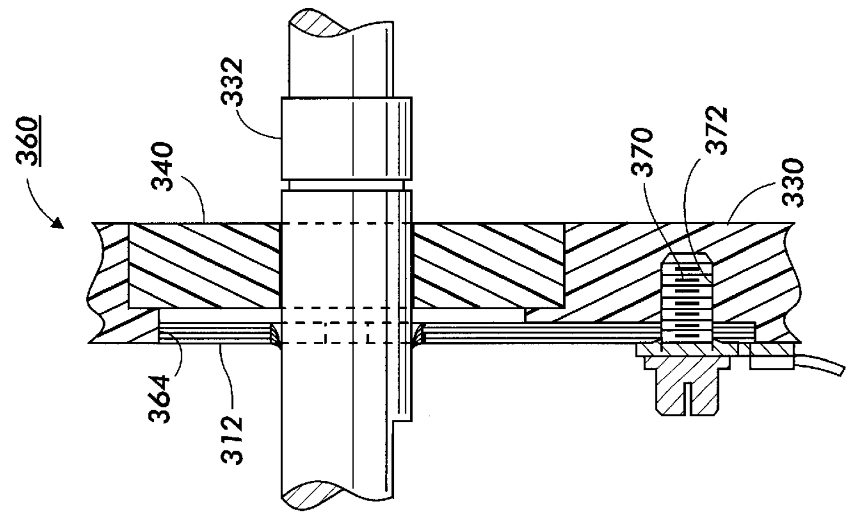
FIG. 3 is an end view of the device of FIG. 2.
Figure 2:
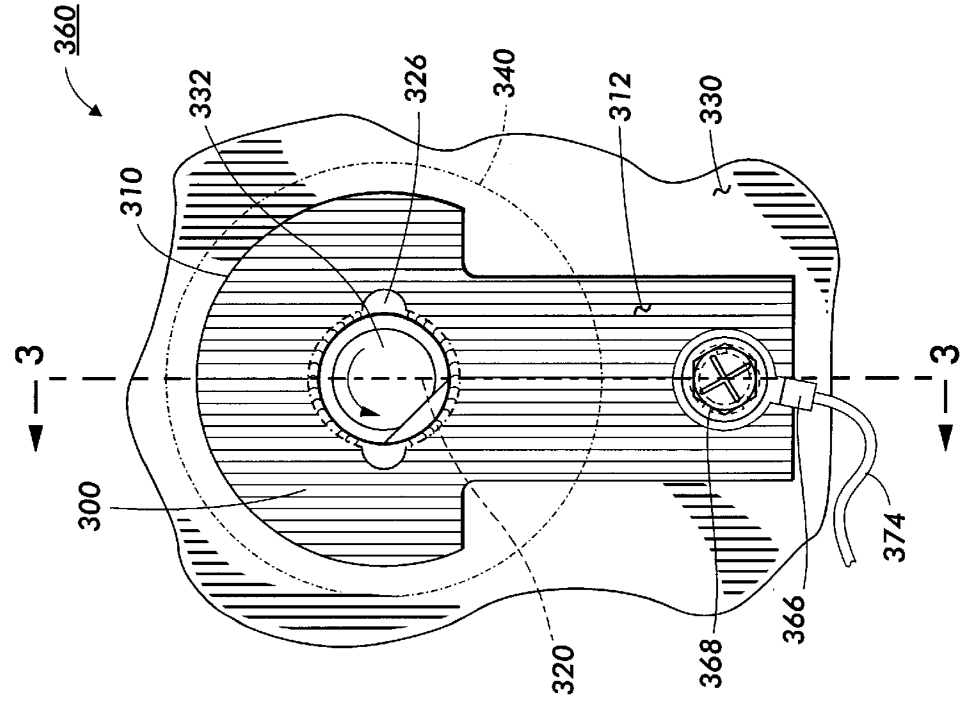
FIG. 2 is a plan view of a first embodiment of the device of FIG. 1 for use to transfer charge from an electrical conduit to a rotating member.

Referring now to FIGS. 2 and 3, an alternate embodiment of the present invention is shown in electrical component 300 for use in mounting system 360 for mounting a shaft 332 within a housing 330. Electrical component 300 is similar to electrical component 100 of FIG. 1 except that electrical component 300 has an outer periphery 310 which is different from outer periphery 110 of the electrical component 100 in that outer periphery 310 has a non-circular portion. The outer periphery 310 fits into cavity 364 of the housing 330. The outer periphery 310 does not require the use of exposed fibers. Instead, an electrically conductive connector 366 is used to contact first face 312 of the electrical component 300. The electrical conductive conductor preferably includes protrusions (not shown) to pierce the first surface 312 of the electrical connector 300. The connector 366 is electrically connected to the housing 330 in any suitable fashion such as by a fastener 368 in the form of a screw with which external threads 370 matingly engage with internal threads 372 on the housing 330. The electrically conductive connector 366 preferably further includes an electrical conduit 374 which is connected to the power supply (not shown) for providing the electrical bias. The shaft 332 is positioned rotatably within the housing 330 by any suitable feature, i.e. by bearing 340. Bearing 340 may be an inexpensive, electrically nonconductive bearing made of a synthetic material. The use of the electrical component 300 permits the use of a less expensive non-electrically conductive material for bearing 340. The electrical component 300 preferably includes channels 326 positioned opposed to fiber axis 320.

By providing a carbon fiber electrical contact in a polymer matrix having a bore therein with a plurality of flexible electrically conductive fibers, a simple, inexpensive and extremely durable electrical contact for a rotating element may be provided.

By providing an electrical contact in the form of a washer-shaped carbon fiber contact in a polymer matrix having channels adjacent the bore of the washer-shaped contact, a path can be provided for the passage of contaminants.

By providing a carbon fiber electrical contact with exposed fibers providing an inner periphery thereof smaller than the diameter of the rotating element, a robust electrical contact can be provided.

By providing a carbon fiber electrical contact in the shape of a washer having an outer periphery thereof with exposed fibers, a robust electrical contact can be made between the electrical contact and an exterior rotating member or a fixed housing.

By providing an electrical component having fibers oriented in at least two directions, there is now an electrical contact having great strength along both the axial direction (that is, in-process direction) and the transaxial direction. Increased strength along the transaxial direction should minimize or eliminate cracking of the electrical component in that direction. Furthermore, it was discovered that the use of fibers oriented in two directions improved the overall reliability of the contact region and did not create excessive fiber loss in the circular contact region of the washer. Laser cutting of the intersection points of the tows contained in the fabric layer(s) was the source for the concern. In addition, using the matrix materials described herein, the electrical component exhibits minimal residue contamination during fabrication using laser cutting processing. Thus, the present electrical component demonstrates high strength, as well as processability and compatibility with laser cutting processes.

While the invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. An electrical component comprising: a plurality of long fibers and a matrix, wherein at least one of the fibers is electrically conductive, wherein the plurality of long fibers includes a first fiber group extending in a manner generally parallel to a first axis, and a second fiber group extending in a manner generally parallel to a different second axis wherein the electrical component has an electrical contact region with fiber end portions at least substantially free of the matrix.

2. The electrical component of claim 1, wherein the first fiber group is angled from the second fiber group by at least about 15 degrees.

3. The electrical component of claim 1, wherein the first fiber group is angled from the second fiber group by a value ranging from about 45 to about 135 degrees.

4. The electrical component of claim 1, wherein first fiber group is angled from the second fiber group by about 90 degrees.

5. The electrical component of claim 1, wherein the plurality of fibers is electrically conductive.

6. The electrical component of claim 1, wherein only the first fiber group is electrically conductive.

7. The electrical component of claim 1, wherein the plurality of fibers is carbon fibers or carbonized polyacrylonitrile fibers.

8. The electrical component of claim 1, wherein the matrix is a polyester.

9. The electrical component of claim 1, wherein the matrix is present in an amount ranging from about 4% to about 40% by weight, the first fiber group is present in an amount ranging from about 30% to about 95% by weight, and the second fiber group is present in an amount ranging from about 0.5% to about 50% by weight, based on the weight of the electrical component.

10. The electrical component of claim 1, wherein the second fiber group and a portion of the first fiber group are a fabric.

11. An electrical component comprising:

(a) a first layer including a plurality of electrically conductive long fibers in a matrix, wherein the first plurality of fibers extends in a manner generally parallel to a first axis;

(b) a second layer including a fabric comprised of a first set of fibers generally parallel to the first axis and a second set of fibers generally parallel to a different second axis; and (c) a third layer including a plurality of electrically conductive long fibers in a matrix, wherein the plurality of fibers extends in a manner generally parallel to the first axis wherein the electrical component has an electrical contact region with fiber end portions at least substantially free of the matrix.

12. The electrical component of claim 11, wherein the fabric is electrically conductive.

13. The electrical component of claim 11, wherein the first layer and the third layer have the same composition.

14. The electrical component of claim 11 comprising:

(d) a fourth layer, beneath the third layer, including a fabric comprised of a first set of fibers generally parallel to the first axis and a second set of fibers generally parallel to the different second axis; and (e) a fifth layer including a plurality of electrically conductive long fibers in a matrix, wherein the plurality of fibers extends in a manner generally parallel to the first axis.

15. The electrical component of claim 14, wherein the first layer, the third layer, and the fifth layer have the same composition, and the second layer and the fourth layer have the same composition.

16. The electrical component of claim 14, wherein the fabric of the second layer and the fabric of the fourth layer are electrically conductive.

* * * * *